3,179,563
MEDICINE FOR COMBATING ILLNESSES OF THE CENTRAL NERVOUS SYSTEM
Eugene Roberts, Monrovia, Calif., assignor to N.V. Koninklijk Pharmaceutische Fabrieken v/h Brocades-Stheemen & Pharmacia, Meppel, Netherlands, a corporation of the Netherlands
Filed Sept. 22, 1960, Ser. No. 57,831
Claims priority, application Netherlands, Sept. 23, 1959, 243,674
5 Claims. (Cl. 167—65)

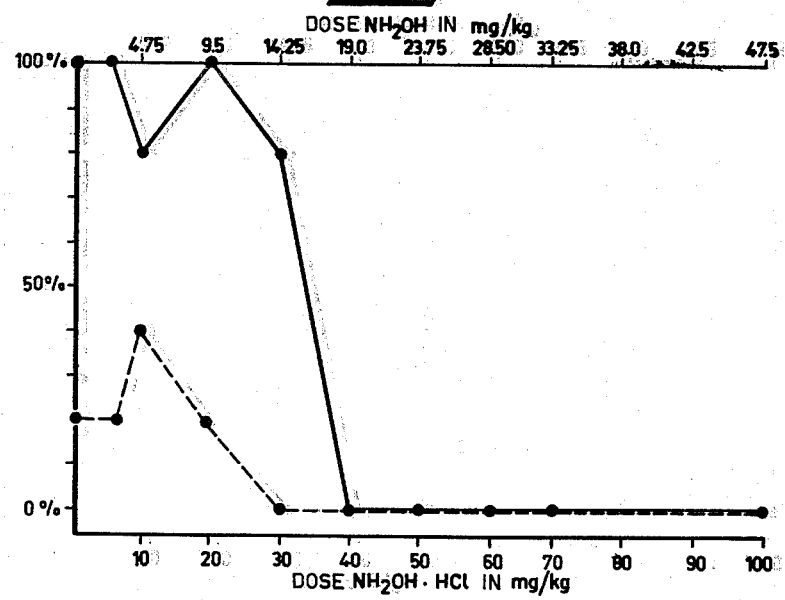
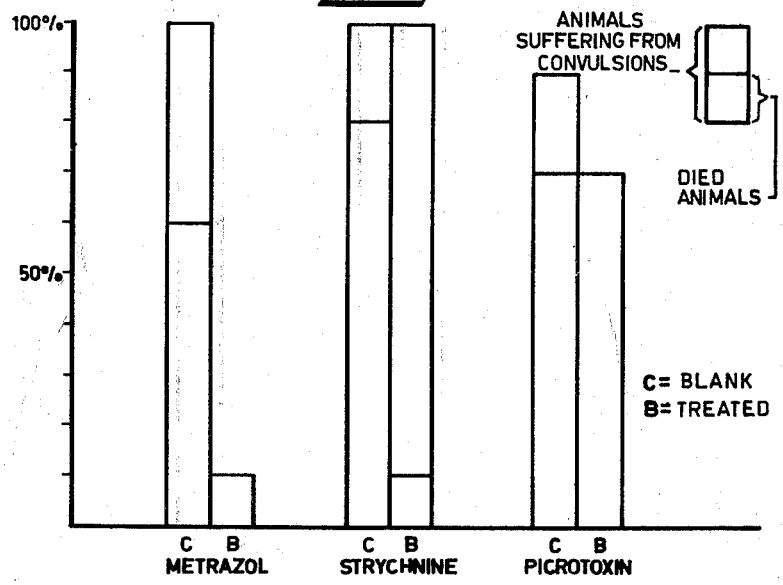

Of recent years the number of publications dealing with gamma-aminobutyric acid and the part it plays in the central nervous system rapidly increases. I refer, for example, to the articles by Ellcott and Jasper, Physiol. Rev. 39, 383 (1959); Kuffler and Edwarts, J. Neurophysiol. 21, 589 (1958); and Roberts et al., Proc. Soc. Exp. Biol. and Med. 97, 796 (1958).

The interest in gamma-aminobutyric acid was aroused, because it was found that in vertebrates said compound could only be shown in the brain and the spinal marrow, whereas all the other compounds reacting to ninhydrin reagent are also found in other tissues as could be shown by subjecting protein free tissue extracts to chromatography.

Upon comparing various parts of the brain it has been found that of all free amino acids that were found in the chromatogram of brain extracts gamma-aminobutyric acid showed the greatest differences in concentration, while at the same time a progressive increase of the concentration in the brains of mice, chicken embryos, tadpoles and rabbits in the various successive stages of their development could be established.

Furthermore it was found that under various conditions of physiological tension the gamma-aminobutyric acid content, just as the content of other amino acids, is relatively constant, while furthermore it was shown that gamma-aminobutyric acid occupies a key position in the alpha-ketoglutaric acid oxidase process of the tricarboxylic acid cycle in the brain, which is a succession of reactions to which, as the last step, the irreversible oxidation of succinic acid semialdehyde to succinate belongs. This last-named reaction in its turn is coupled to an oxidative phosphorylation.

The first indication that gamma-aminobutyric acid plays a physiological part in mammals was obtained from investigations concerning the mechanism of the action of convulsant hydrazides. The administration of various kinds of hydrazides to animals generally results in a number of repetitive fits; said fits are followed by a rather lengthy latent period. It appeared that during said latent period the liability to fits caused in various manners had increased to a great extent.

It was found that convulsions caused by the administration of hydrazides were attended inter alia by a substantial decrease in the gamma-aminobutyric acid content in the brain and also in individual parts of the brain.

Experiments with glutamic acid tagged with $C^{14}$ as a tracer, from which acid gamma-aminobutyric acid is formed, showed that if the said glutamic acid is intracerebrally administered to mice which previously had been given a thio-semicarbazide-injection this convulsant hydrazide appreciably slowed down the rate at which glutamic acid is converted into gamma-aminobutyric acid even before the convulsions manifested themselves. By a local administration of gamma-aminobutyric acid the convulsant influence of thio-semicarbazide in cats could be counteracted and convulsions in the rhinencephalon and the isocortex caused by electric stimuli could be shortened by the use of gamma-aminobutyric acid.

It stands to reason that local administration of gamma-aminobutyric acid is an exceedingly difficult operation, especially when it is necessary to introduce the compound in an accurately defined place in the brain. Any other manner of administration, however, is impossible because gamma-aminobutyric acid is not capable of passing the so-called "blood brain barrier."

I have, therefore, sought for substances which admit of being administered orally and which by their appropriate checking effect on reactions which threaten to decrease the gamma-aminobutyric acid content, on the one hand, and by stimulating the reaction whereby gamma-aminobutyric acid is formed, on the other hand, bring about an increase of the content of the last-named compound.

I have now found that hydroxyl amine, hydroxamic acids and/or oximes and salts thereof have a favorable influence on the central nervous system.

The hydroxamic acids to be used according to the invention may be derived from aliphatic, cyclo-aliphatic, aromatic or heterocyclic monocarboxylic acids, dicarboxylic acids, hydroxycarboxylic acids, ketocarboxylic acids, aminocarboxylic acids and the like.

The oximes may be obtained from e.g. aliphatic, cyclo-aliphatic, aromatic or heterocyclic aldehydes, ketones, aldehyde acids, keto acids, aminoketones or aminoketo acids.

Some examples of compounds suitable for the production of the preparations according to the invention are subjoined.

Hydroxamic acids derived from:
   Lower fatty acids
   Benzoic acid
   Anthranilic acid
   Pyridinecarboxylic acids
Oximes derived from:
   Propionaldehyde
   Benzaldehyde
   Pyridylaldehyde
   Acetone
   Cyclohexanone
   Methylnaphthylketone
   Amino acetone
   Symm. diaminoacetone
   Pyruvic acid
   Dimethyl, methylethyl, phenyl or chlorophenylpyruvic acid
   Ketoglutaric acid The medicines are preferably administered in the form of preparations obtained by incorporating the above mentioned substances in a solid pharmaceutical carrier, e.g. in tablet form.

The doses to be administered may vary in accordance with the compounds chosen and the nature of the disorders to be treated. Suitable doses generally range between 2 and 100 milligrams and accordingly the invention also relates to a method of producing preparations having a favorable influence on the central nervous system, which is characterized in that hydroxyl amine, hydroxamic acid and/or oximes and the salts thereof respectively are brought in dosages suitable for pharmaceutical administration, which dosages each contain an amount of from 2–100 milligrams of the active substance.

I have found that these compounds owing to their effect on the central nervous system not only have a favourable influence on convulsions, especially those occurring during attacks of epilepsy, but also on convulsive and paralytic conditions as occur in the case of paraplegia. Furthermore the administration of the said compounds according to the invention has a favourable effect on mental disorders such as schizophrenia, especially those of a catatonic nature and on all kinds of psychotic neuroses.

The favorable influence of the compounds according to the invention, in the first place hydroxylamine or salts thereof, on the gamma-aminobutyric acid content of the brains of experimental animals can be shown with reference to Tables I and II.

If desired methylene blue may be administered in addition to the hydroxyl amine in order to counteract the methemoglobinemia caused by hydroxyl amine as much as possible.

*Table I*

Influence of hydroxylamine on the gamma-aminobutyric acid content in the brains of rats.

| Brain part | Gamma-aminobutyric acid content in mg. percent | |
|---|---|---|
| | Check | 4.9 mg. $NH_2OH$ per rat |
| Diencephalon | 58 | 71 |
| Colliculi | 57 | 71 |
| Olfactory lobes | 42 | 52 |
| Cortex | 27 | 47 |
| Cerebellum | 28 | 40 |

The gamma-aminobutyric acid was determined by means of an enzymatic method described in J. Biol. Chem. 234, 932 (1959); the method was slightly modified for this purpose.

For each test three male Wistar rats having a weight of from 160–190 grams were used. The animals were killed 70–90 minutes after the injection.

*Table II*

The influence of hydroxylamine on the gamma-aminobutyric acid content in three parts of the cortex of the brains of monkeys

| Cortex | Dose of $NH_2OH$ in mg./kg. | Gamma-aminobutyric acid content in mg. percent | |
|---|---|---|---|
| | | Before administration | After administration |
| Monkey I: | | | |
| Motor | 4.9 | 15.5 | 22.6 |
| Parietal | 4.9 | 12.4 | 21.7 |
| Occipetal | 4.9 | 14.1 | 25.5 |
| Monkey II: | | | |
| Motor | 7.4 | 14.9 | 34.1 |
| Parietal | 7.4 | 14.7 | 35.5 |
| Occipetal | 7.4 | 13.6 | 40.2 |

One same of each cortex part indicated was removed prior to the intravenous administration of hydroxylamine, the other sample being taken from the opposite portion, 90 minutes after the injection of hydroxylamine.

In rats the increase of the gamma-aminobutyric acid can also be clearly shown chromatographically.

The therapeutic effect of the substances used according to the invention can be shown by administering said preparations to experimental animals in which animals convulsions had been created artificially by electrical stimuli or by the addition of certain chemical substances.

FIGURE 1 shows the influence of different doses of hydroxyl amine on convulsions caused by the administration of 50 mg./kg. of metrazol to rats.

The hydroxyl amine was always injected two minutes before the metrazol. In the figures each point corresponds with ten rats. The line drawn indicates the number of rats which suffered from convulsions; the dotted line indicates the number of animals that died. It appears that even a small dose, namely 30 mg./kg. hydroxylamine HCl, reduces the death rate of the animals to zero and that by an increase in the dose the attacks can be entirely suppressed.

In another experiment, the results of which are graphically shown in FIGURE 2, a dose of 50 mg./kg. of metrazol caused convulsions in 100% of the cases, which convulsions resulted in the death of 60% of the animals. Intraperitoneal administration of hydroxyl amine one hour before the administration of metrazol resulted in an attack in only one of the 35 experimental animals which attack however, had no fatal consequences.

In rats a treatment with 48 mg./kg. hydroxylamine did not decrease the number of attacks owing to the administration of 2 mg./kg. of strychnine, however, the death rate partly decreased. A treatment with hydroxylamine had no significant results in the case of disorders caused by picrotoxin.

All of the preceeding illustrations of the invention concern the effect of hydroxylamine. The other compounds according to the invention show results which only differ in degree but not in nature from the results obtained with hydroxylamine.

I claim:
1. A process for the treatment of illnesses of the central nervous system characterized by convulsions and psychotic neuroses, which comprises administering at least two milligrams per day of a material selected from the group consisting of hydroxylamine, and an amide of hydroxylamine with an acid selected from the group consisting of lower fatty acids, benzoic acid, anthranilic acid and pyridinecarboxylic acids, oxime of propionaldehyde, benzaldehyde, pyridylaldehyde, acetone, cyclohexanone, methylnaphthyl ketone, amino acetone, symm. diaminoacetone, pyruvic acid, ketoglutaric acid and dimethyl-, methylethyl-, phenyl- and chlorophenylpyruvic acid, and therapeutically acceptable salts of said hydroxylamine, amides and oximes to animals suffering from said illnesses.

2. A process according to claim 1, in which said selected material is administered in admixture with a solid pharmaceutically acceptable carrier.

3. A process according to claim 1, in which the amount of said selected material administered per day is less than 100 milligrams.

4. A proceses according to claim 3, in which said selected material is administered in admixture with a solid pharmaceutically acceptable carrier.

5. A process for the treatment of illnesses of the central nervous system characterized by convulsions and psychotic neuroses, which comprises administering from two to one hundred milligrams per day of hydroxylamine in admixture with a pharmaceutically acceptable carrier to animals suffering from said illnesses.

References Cited by the Examiner

Askew: C.A. 51, 9934d, 1957.
Baxter: Proc. Soc. Exper. Biol. Med., vol. 101, No. 4, August, September 1959, pages 811–815.
Eidelberg: Proc. Soc. Exper. Biol. Med., vol. 101, No. 4, August, September 1959, pages 815–817.
Epstein: Proc. Soc. Exptl. Biol. 92, pp. 660.2, 1956.
Roberts et al.: J. Biol. Chem. 188, pp. 789–95, 1951.
Roberts et al.: J. Biol. Chem. 191, pp. 277–85, 1951.
Wingo et al.: J. Biol. Chem. 187, pp. 267–71, 1950.

JULIAN S. LEVITT, *Primary Examiner.*

WILLIAM B. KNIGHT, MORRIS O. WOLK,
*Examiners.*

UNITED STATES PATENT OFFICE
CERTIFICATE OF CORRECTION

Patent No. 3,179,563            April 20, 1965

Eugene Roberts

It is hereby certified that error appears in the above numbered patent requiring correction and that the said Letters Patent should read as corrected below.

In the grant, lines 2 and 3, and lines 13 and 14, and in the heading to the printed specification, lines 4 to 6, for "N.V. Koninklijk Pharmaceutische Fabrieken v/h Brocades-Stheemen & Pharmacia", each occurrence, read -- N.V. Koninklijke Pharmaceutische Fabrieken v/h Brocades-Stheeman & Pharmacia --.

Signed and sealed this 8th day of March 1966.

(SEAL)
Attest:

ERNEST W. SWIDER
Attesting Officer

EDWARD J. BRENNER
Commissioner of Patents